US006631008B2

(12) United States Patent
Aoki

(10) Patent No.: US 6,631,008 B2
(45) Date of Patent: Oct. 7, 2003

(54) NETWORK SYSTEM, INFORMATION PROCESSING APPARATUS, AND INFORMATION MEMORY MEDIUM

(75) Inventor: Mikio Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/049,937

(22) Filed: Mar. 30, 1998

(65) Prior Publication Data

US 2002/0041388 A1 Apr. 11, 2002

(30) Foreign Application Priority Data

Mar. 28, 1997 (JP) ............................................. 9-077573
Dec. 25, 1997 (JP) ............................................. 9-358621

(51) Int. Cl.$^7$ ............................ G06F 13/00; G06F 3/12
(52) U.S. Cl. ..................... 358/1.15; 358/1.13; 358/1.14
(58) Field of Search .............................. 358/1.14, 1.12, 358/1.15, 1.18, 1.13, 1.9, 401, 408, 438; 709/200, 201–206, 213, 220, 223–232; 710/1–12, 31–34

(56) References Cited

U.S. PATENT DOCUMENTS

| 5,577,172 A | * | 11/1996 | Vatland et al. ............... 395/114 |
| 5,619,624 A | * | 4/1997 | Schoenzeit et al. .......... 395/118 |
| 5,638,497 A | * | 6/1997 | Kimber et al. ............... 395/114 |
| 5,930,465 A | * | 7/1999 | Bellucco et al. ............. 395/114 |

FOREIGN PATENT DOCUMENTS

| JP | 5-204565 | 8/1993 | ............. G06F/3/12 |
| JP | 8-44677 | 2/1996 | ............. G06F/15/16 |
| JP | 8-305512 | 11/1996 | ............. G06F/3/12 |
| JP | 8-339276 | 12/1996 | ............. G06F/3/12 |

* cited by examiner

*Primary Examiner*—Gabriel Garcia
*Assistant Examiner*—Douglas Tran
(74) *Attorney, Agent, or Firm*—James A. Oliff, PLC

(57) ABSTRACT

An information processing apparatus, an information memory medium, and a network system are provided which can efficiently select the most appropriate printer from among a plurality of printers which are connected to the network, and perform a printing operation. This network system may include at least one server and a plurality of printers connected through a communication line. In the server, based upon a printing instruction which is transmitted from a computer, an inquiry signal is output to each printer. The printer to be used for printing is then selected based upon the information transmitted from a processor of each printer. Any processor which responds to the inquiry signal is an option selection for printing data from the network system, including an unknown processor or an upgraded processor. Thus, even if a user disconnects one of the selected printers from the network system, the network system can submit printing data to another printer that responded to the inquiry signal as a match selected for printing. Furthermore, data conversion processing is performed in order to convert the image data to printing data for printing.

14 Claims, 11 Drawing Sheets

NETWORK SYSTEM, INFORMATION PROCESSING APPARATUS, AND INFORMATION MEMORY MEDIUM

BACKGROUND OF THE INVENTION

1. Field of Invention

This invention relates to a network system, information processing apparatus, and information memory medium which convert image data transmitted from an information terminal connected to the same line, into print data for printing to a corresponding printer.

2. Description of Related Art

Presently, a plurality of printers are often connected to a network, and image information handled by a terminal of, for example, a personal computer or the like, is printed using any one of the printers.

For image information handled by the above-mentioned computer, there are many still images and moving images obtained via, for example, the Internet, and the these types of images are often high quality images of many gray scales and high resolution.

However, in order to print this type of high image quality image data, it is necessary to perform a process of converting image data to print data suitable to the desired image quality. Therefore, a printer with a high processing capability is required.

However, many printers of various types are often attached to the network, and it is rare that all of the printers attached to the network have the above-mentioned processing capability.

Therefore, it is conceivable that an image processing server of a printer of low processing capability is attached to the network. Once image data which is output from the computer is inserted into the image processing server and print data is generated, this print data is transmitted to the low capability printer via a circuit and is printed.

However, when performed as such, the relationship between the image processing server and the printer is fixed. Because of this, the optimum printer cannot be determined or used while considering the conditions of use of all printers connected to the network. As a result, the problem arises of not being able to effectively use the plurality of printers connected to the network.

In addition, as described above, the relationship between the server and each printer is fixed. In the case of an additional new printer connected to the network, the server may not be able to correspond flexibly with the new printer.

SUMMARY OF THE INVENTION

This invention reflects upon these types of problems, and has an objective of providing a network system, information processing apparatus and information memory medium, which can effectively select the optimum printers from among the plurality of printer connected to the network based on the quality of printing image data and the availability of each printer to perform a printing operation.

To achieve the above objective, the invention may include a server which receives a printing instruction and image data for printing which are transmitted from a terminal, and at least one printer which is connected to the server through a wire. The server may include a printer server to output a device information inquiry signal based upon a printing instruction from the terminal. The printer server selects a printer for an intended printing data transmission based upon device information which is received from each device in response to the inquiry signal.

The server may also include an image processing server which performs data conversion processing in order to convert image data from the terminal to printing data and transmits the printing data, which is formed by the data conversion processing, to the selected printer.

The printer may include a device information transmission control device which, in response to the device information inquiry signal, transmits the device information, including the printer's own classification information, to the server, and prints printing data received from the image processing server.

Furthermore, an information processing apparatus may be included that may receive a printing instruction and image data for printing which are transmitted from a terminal. The information processing apparatus may include a printer server which outputs a device information inquiry signal based upon a printing instruction from the terminal. The printer server selects a printer for an intended printing data transmission based upon the device information which is received from each device corresponding to the inquiry signal.

An image processing server may be included that performs data conversion processing to convert image data from the terminal to printing data and transmits printing data formed by the data conversion processing to the selected printer.

Moreover, an information memory medium may be included for controlling an information processing apparatus that can receive a printing instruction and image data for printing that are transmitted from a terminal.

The information memory medium may include information to output a device information inquiry signal based upon a printing instruction from a terminal and select a printer for an intended printing data transmission based upon device information which is received from each device in response to the inquiry signal. The information memory medium may also include information for performing data conversion processing to convert image data from the terminal to printing data and transmit the printing data that is formed by the data conversion processing to the selected printer.

The aforementioned image data is, for example, image data and the like which is retrieved from a network, such as the Internet or the like, image data obtained from image output devices, such as video cameras, electronic cameras and the like, or image data which is read-out from various types of memory apparatuses.

A printing instruction and image data for printing may be transmitted from a terminal to the server. First of all, the server outputs a device information inquiry signal to each printer or the like, based upon a printing instruction.

Any processor which responds to an inquiry signal from the server is an option selection for printing data from the network. This includes a response from an unknown processor or upgraded processor. Thus, if a user disconnects a printer, which is selected as a match to the printing data from the network, the network can re-submit the printing data to another printer that has responded to the inquiry signal as a match selected for printing.

Each printer transmits device information including its own classification information to a server in response to the inquiry signal. Based upon the device information from each printer, the server selects a printer for the intended printing data transmission. That is, from among the printers which are suitable as to the image quality of the image data, a printer which currently has the least printing delay is selected as the printer for the intended printing data transmission. Furthermore, the server directs the printing of printing data for each printer so that the printing delay of each printer described above, can be determined based upon the data which the server has acquired. In addition, when a plurality of servers exist, since the plurality of servers direct the printing operation, each server can determine the printing delay period of each printer, based upon the data which all of the servers have collected by using a configuration which performs sending and receiving of data between each server as needed.

As described above, the server can function as a printer server to determine the most appropriate printer from among a plurality of printers connected to the network when a printing instruction is transmitted from a terminal.

Next, the server performs data conversion processing to convert image data from the terminal to printing data, and the printing data which is formed is transmitted to the selected printer. In other words, the server functions as an image processing server.

Furthermore, the data conversion processing includes, for example, processing to convert RGB image data to CMYK, processing to develop characters and lines into a bit map, image processing, such as color conversion processing, to convert color according to printer type, printer language conversion processing, processing to add printer languages, and the like. The printer to which the printing data is transmitted then print-outputs the printing data.

As described above, when a printing instruction and image data for printing are transmitted to a server from a terminal, the server can select the most appropriate printer from among a plurality of printers according to the availability, image quality of image data to be printed, and the like, transmit the printing data to the printer, and print the printing data.

Therefore, it is possible to flexibly and efficiently use a plurality of printers connected to the network in response to their classification and availability status. Furthermore, the server may determine the most appropriate printer based upon device information which can be attained in response to an inquiry signal, so that it is possible for the server to flexibly respond to having the new printer placed on the network.

In order to determine the most appropriate printer from among a plurality of printers connected to the network in response to the image quality of the printing image data, a server may include a memory that stores a data processing program to convert printing capability information and image data to printing data for printers of different classifications.

The server may also include a printer server that determines a printer for an intended printing data transmission based upon the printing capability information which is read out from the memory in response to the load status of each printer and the printer's classification information. An image processing server may also be included that performs data conversion processing to convert image data to printing data by using a data processing program that corresponds to the classification of the selected printer.

The image processing apparatus may include a memory which stores a data processing program to convert printing capability information and image data to printing data for each printer of a different classification. The printer server may determine a printer for printing a data transmission based upon the load status of each printer and the printer's capability information which is read out from the memory corresponding to the printer's classification information. Furthermore, the image processing server may perform data conversion processing to convert image data to printing data by using a data processing program corresponding to the classification of the selected printer.

The server may store unique capability information and data processing programs of printers of different classifications. Capability information may include printer resolution data of printers of different classifications, and the data processing programs may be programs for performing data conversion processing of image data for printing according to image quality. That is, the image quality data may include the number of gray scales and resolution of the printer, and form printing data.

Furthermore, the server refers to the unique capability information corresponding to classification information, and to the availability status of the printer based upon the classification information included in the device information which is obtained from each device. Moreover, based upon the capability information and the availability status of each printer, a printer for an intended printing data transmission is selected. Other than the availability status and capability information, it is preferable to select a printer for the intended printing data transmission, considering, as needed, the paper size, the remaining amount of ink, and the like, which can be used for printing.

Furthermore, the server performs data conversion processing to convert image data to printing data based upon a data processing program that corresponds to the classification of the selected printer. Therefore, it is possible to form printing data with a number of gray scales and a resolution suitable to the capability of the printer and print-output the printing data from the selected printer.

The printer server may also output a device information inquiry signal toward either another server or a printer based upon a printing instruction from a terminal, determine at least one of the devices among either another server or a printer which shares the data conversion process based upon the device information which is received from other devices in response to the inquiry signal, and transmit a sharing instruction and shared image data to the determined device.

The image processing server may perform data conversion processing of shared image data, based upon the sharing instruction, and transmit printing data which is formed by the data conversion processing to the selected printer.

The printer server may also output a device information inquiry signal to either another server or printer based upon a printing instruction from a terminal, select either another server or printer which shares the data conversion process based upon the device information that is received from other devices in response to the inquiry signal, and transmit a sharing instruction and sharing image data to the selected device.

The image processing server may also perform data conversion processing of shared image data based upon the sharing instruction, and transmit printing data which is formed by the data conversion processing to the selected printer. That is, when the volume of image data for printing is large, there is often a situation where it is difficult to perform high speed printing due to the time consumption if only one server processes the large volume of data by itself. In particular, when a large volume of high quality image data needs to be printed, it is not possible to perform conversion processing of image data to printing data at a high speed even if a server with high capability is used.

The server that received a printing instruction and image data for printing from the terminal transmission outputs a sharing inquiry signal to either another server or printer and collects device information of other devices. Furthermore, based upon the information of other devices which were collected, either another server or printer that will share the data conversion processing of image data is selected, and a sharing instruction and shared image data are transmitted to the selected device.

In order to share the data conversion processing with a printer, it is necessary to select a printer with data conversion processing capability to convert image data to printing data. The other device, which received the sharing instruction and shared image data, performs data conversion processing of shared image data and transmits formed printing data to a determined printer.

As described above, since printing data is formed by the sharing and processing of image data by a plurality of devices, it is possible to convert and print-output a large volume of image data to printing data at high speed.

The printer server may also output a device information inquiry signal to either another server or printer based upon a printing instruction from a terminal, determine priority of the printers for an intended printing data transmission based upon the device information which is received from other devices in response to the inquiry signal, perform a determination selection inquiry to the terminal, and select the printer for the printing data transmission based upon selection information provided by the terminal.

The printer server may output a device information inquiry signal to either another server or printer based upon a printing instruction from the terminal, determine priority of the printer for printing a data transmission based upon the device information that is received from other devices in response to the inquiry signal, perform a determination selection inquiry to the terminal, and select the printer for printing the data transmission based upon selection information of the terminal.

When there is a printing instruction from the terminal, the server may determine the priority of the printer for printing a data transmission from among a plurality of printers connected to the network and perform a determination inquiry to the terminal. Therefore, a user may determine the most appropriate printer from among a plurality of printers to print image data. In particular, the user can determine, for example, the physically closest printer in which to print image data.

The device information may include data processing program version information which is stored in the printer memory. The server may determine a need for updating the version of the data processing program which is stored in the printer memory, and further include a device that transmits information for updating of the data processing program version to the printer when a need for updating the version arises.

The printer may further include a device that performs updating of the data processing program and the version information which are stored in the printer's own memory when the information for updating the version of the data processing program is received from the server.

The device information may include data processing program version information for storage in the printer memory. A device that may determine a need for updating a version of the data processing program stored in the printer memory, and may transmit information for updating the version of the data processing program to the printer when a need for updating the program version is determined.

For example, the server determines whether the version of the data processing program stored in the printer memory matches the version stored in the server's own memory simultaneously with performing the data conversion processing operation. When the server determines that the versions do not match, the server sends the appropriate upgrade information to the printer.

When printing data is sent to the printer from the server, since the program for image processing in each printer is also simultaneously upgraded, the entire system is constantly unified with the program with the most current program version. In addition, by using a printer with the high capabilities, the printer may also function as the server.

A device information transmission control device may transmit device information, including the printer's own classification information, to the server in response to a device information inquiry signal from other devices.

The network system may also be formed as being accessible from an external terminal apparatus. The server of the network system which was accessed may transmit printing data to a selected printer from inside the system.

When a terminal is used, such as a computer, in order to externally access for the server for sending printing instructions and image data, the image data can be print-output by using a printer from the network system.

In particular, even when the image data is sent to a network system in another country which has different printing standards, for example, image data is converted to the printing data which conforms to the printing standards in that country by the server, and is then print-output. For instance, when a network system is found in an office in the U.S. and printing data and image data are sent to the network system in the U.S. from Japan, the image data sent is converted to printing data which conforms to the U.S. standards and is print-output.

The printer server may also output a device information inquiry signal based upon a printing instruction and image data which are transmitted from a terminal, select another server or printer which is responsible for the data conversion processing based upon the device information which is received from each device in response to the inquiry signal, and transmit data conversion instructions and image data to the selected device for printing.

The other server or printer performs data conversion processing of the image data and forms printing data based upon the data conversion instructions, and includes an image processing server that transmits the printing data to the printer.

When a server and several printers are connected on the network, there are many instances where the user desires to print image data by using a specific printer depending on the circumstances. For example, there are many instances where the user wishes to print-output image data from a printer that is installed at a location nearest to the user's terminal.

However, the printer may not necessarily have the sufficient data conversion processing capability. When the printing instruction and the image data which is intended for printing is sent to the aforementioned printer from the terminal, the printer which receives the data outputs a device information confirmation signal to the other devices, and performs the collection of other device information. Then, the printer determines another server or printer which is responsible for the data conversion processing, and sends out a data conversion instruction and image data to the device.

The other device which receives this data performs data conversion processing of the image data based on the data conversion instructions. The print data which is created by the other device is returned to the printer. Then, the printer which received the printing instruction from the terminal print-outputs the printing data which is returned from the other device.

Thus, even when the printer which the user wishes to use does not have the sufficient capability, the system may use the data conversion processing capability of another device which is connected to the network and can easily print-output high quality image data from the existing printer.

BRIEF DESCRIPTION OF THE DRAWINGS

The preferred embodiments of this invention will be described in detail, with reference to the following Figures, wherein.

DETAILED DESCRIPTION OF PREFERRED EMBODIMENTS

Figure 1:
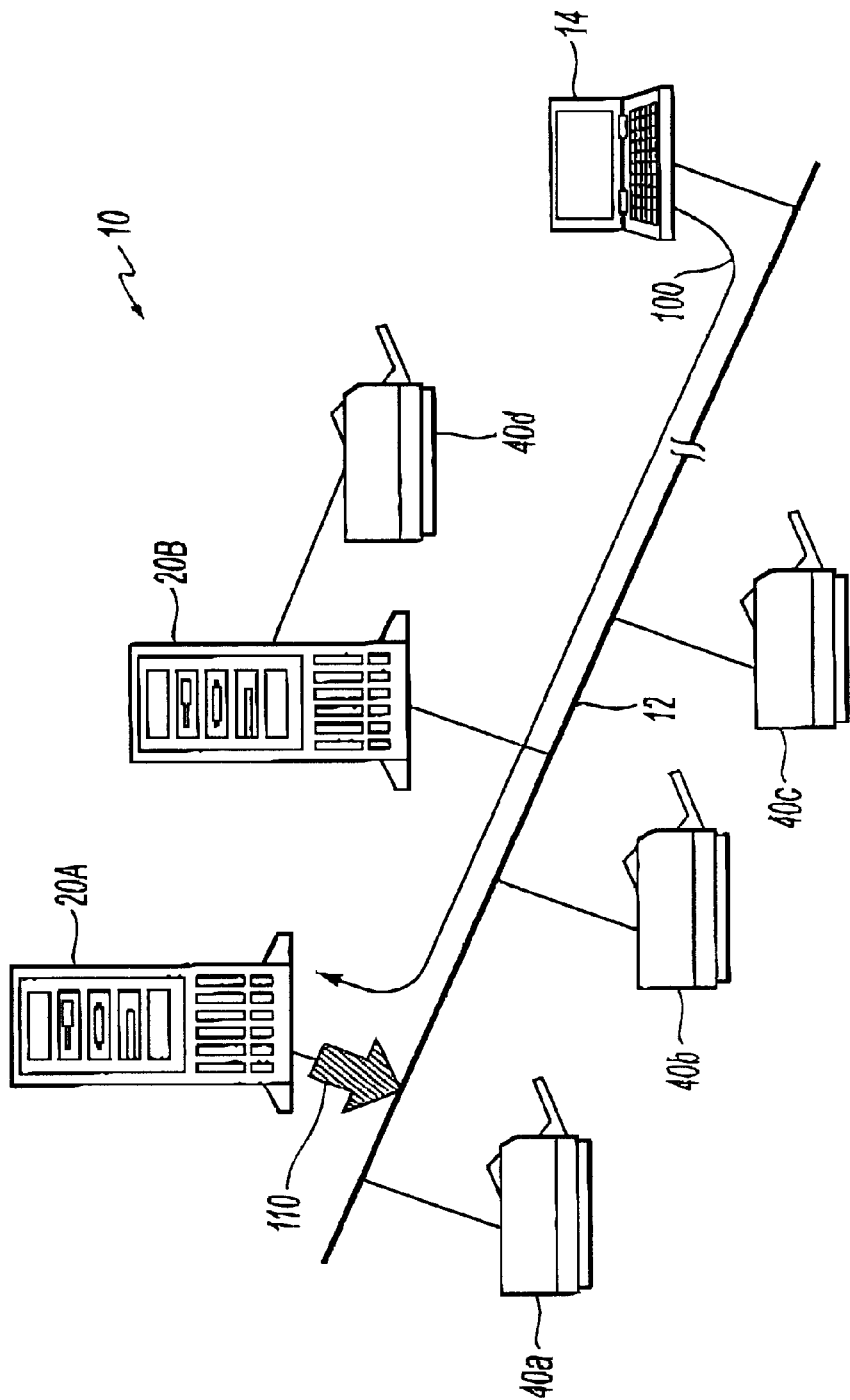
FIG. 1 is a block diagram of the network system of an embodiment of the present invention.

The preferred embodiments of the present invention are explained in detail below based on the drawings. FIGS. 1–5 show the exemplary structure of the first embodiment of the network system of the present invention. As shown in the figures, a plurality of servers 20A and 20B and a plurality of printers 40a, 40b, 40c, and so on, are connected to the network system 10 via the communication lines 12. Moreover, among the printers, there is a printer 40d that is directly connected to the server 20B. Moreover, the printers 40a–40c are structured so that additional printers can be installed with respect to the communication lines 12 or the server 20, if necessary.

Moreover, computer 14, which is an information terminal, is connected to the network system 10 via the communication lines 12. The computer 14 can access the Internet and receive information, such as characters, still images, animated image sounds or the like. Moreover, while it can also take-in image data via various kinds of input/output media, the computer 14 can also create image data on its own.

In the network system of the present embodiment, as shown in FIG. 1, when a printing instruction and image data 100 intended for printing are sent to the desired server 20 which exists on the network system 10, the server 20 receives the printing instruction and image data 100 and determines the optimum printer for printing among the plurality of printer 40a–40c, performs data conversion processing on the printing data suitable to the image quality, and print an output by using the determined printer.

Figure 6:
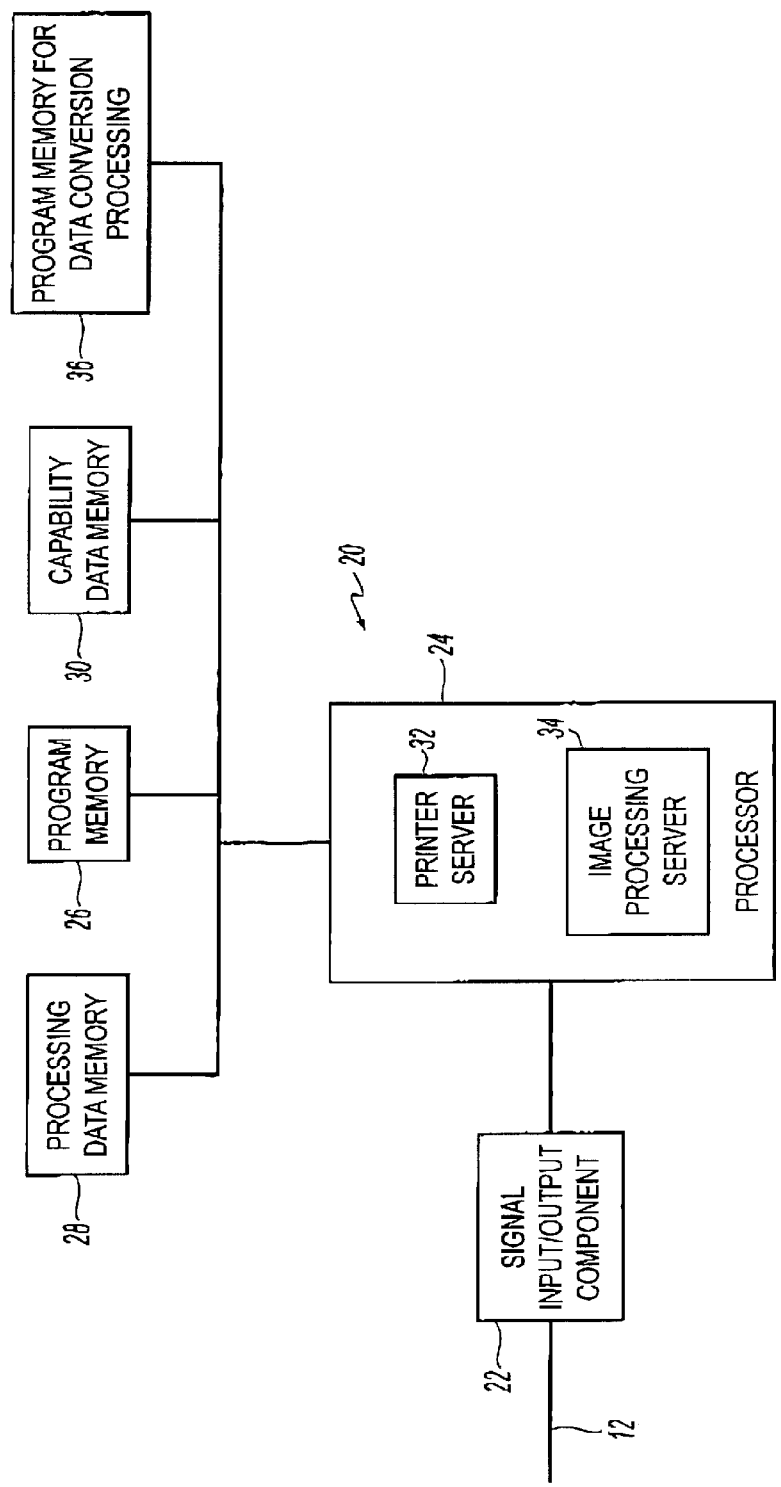
FIG. 6 is a block diagram of the server which is used in an embodiment of the present invention.

FIG. 6 shows a function block diagram of the server 20, which represents any of the servers 20A, 20B shown in FIG. 1. The server 20 of the present embodiment comprises a signal input/output component 22 which performs transmission of data via the communication line 12, a processor 24 which may be a CPU or the like, a program memory 26 in which various operating programs are stored, a processing data memory 28 which stores the printing data which is created by data conversion processing of the image data, a capability data memory 30 which stores the capability information which is characteristic to the different kinds of printers, and a data conversion processing program memory 36 in which data processing programs for creating the printing data from the image data are stored for each of the various printers.

Identifications (ID's) which specify the machine types of the various printers, corresponding resolutions, and other capability data are stored in the capability data memory 30 for every type of the printer. Furthermore, the data processing programs which are stored in the data conversion processing program memory 36 are stored in correlation to the ID's which specify the machine types of the various printers, along with their program version data.

Then, through instruction of the operator, the server 20 of the present embodiment accesses the host computer (not shown) periodically via the communication line 12, and downloads the ID's of the new printers, along with the corresponding capability information, data processing program information, program version information, and the like, to the capability data memory 30 and the data processing conversion program memory 36.

The calculation processor 24 functions as a printer server 32 and an image processing server 34, based on the operating programs stored in the program memory 26, the data conversion processing program stored in the program memory 36, and the like.

The printer server 32, based on the printing instruction from the computer 14, outputs an device information inquiry signal to the printers 40a–40c and the other server(s) 20A–20B which comprise the network system 10. Then, corresponding to this inquiry signal as described below, one of the printers 40a–40c is selected based on the device information which is received from each device.

Specifically, the resolution of each printer which is stored in the capability data memory 30 is evaluated based on the ID's which are included in the device information which is returned from each printer 40a–40c in response to the inquiry signal, and the printers 40a–40c are identified which have resolutions corresponding to the image quality of the image data. Next, the printing delay time is determined from the identified printers, and a priority order is determined according to the smallest delay time. Then, one of the printers 40a–40c which has the highest priority is selected as the one for the intended printing data transmission.

Moreover, depending on necessity, it is appropriate that the printer server 32 sends out the information for this priority order to the computer 14 via communication lines 12, and allows the user to determine the printer for printing the data. In this case, the printer information which was selected by the user by using the computer 14 is returned to the server 20 via communication line 12, and the printer server 32 performs the final selection of the printer for the intended printing data transmission.

The image processing server 34 converts image data to printing data in order by using the data conversion processing program which corresponds to the ID of the selected printer, and writes the converted printing data to the processing data memory 28. Then, the printing data which is written to the processing data memory 28 is output to the selected printer for the intended printing data transmission via the communication lines 12.

In the network system 10 of the present embodiment, the servers 20A–20B basically perform the printing control of each printer 40a–40c. Therefore, when only one of the servers 20A–20B exists, the server is able to determine the current delay time of each printer 40a–40c from the data in the processing data memory 28 of the existing server. Accordingly, when the printer server 32 prioritizes the printer for the intended printing data transmission, it is appropriate to refer to the data stored in the processing data memory 28.

Further, as shown in FIG. 1, there are cases when the printing of each printer 40a–40c is shared and controlled by using a plurality of servers 20A–20B, or cases when a high capacity printer among the plurality of the printers 40a–40c is caused to function as an image processing server. In these cases, each server 20A and 20B and/or the printer 40a–40c which functions as a server, is structured to return data which shows the current extent of the print processing amount which is being executed by each printer 40a–40c to the printer server 32 in response to the inquiry signal from the printer server 32.

By doing this, the printer server 32 determines the delay time of each printer accurately, and can also accurately set the priority order of the printer for the intended printing data transmission.

Figure 7:
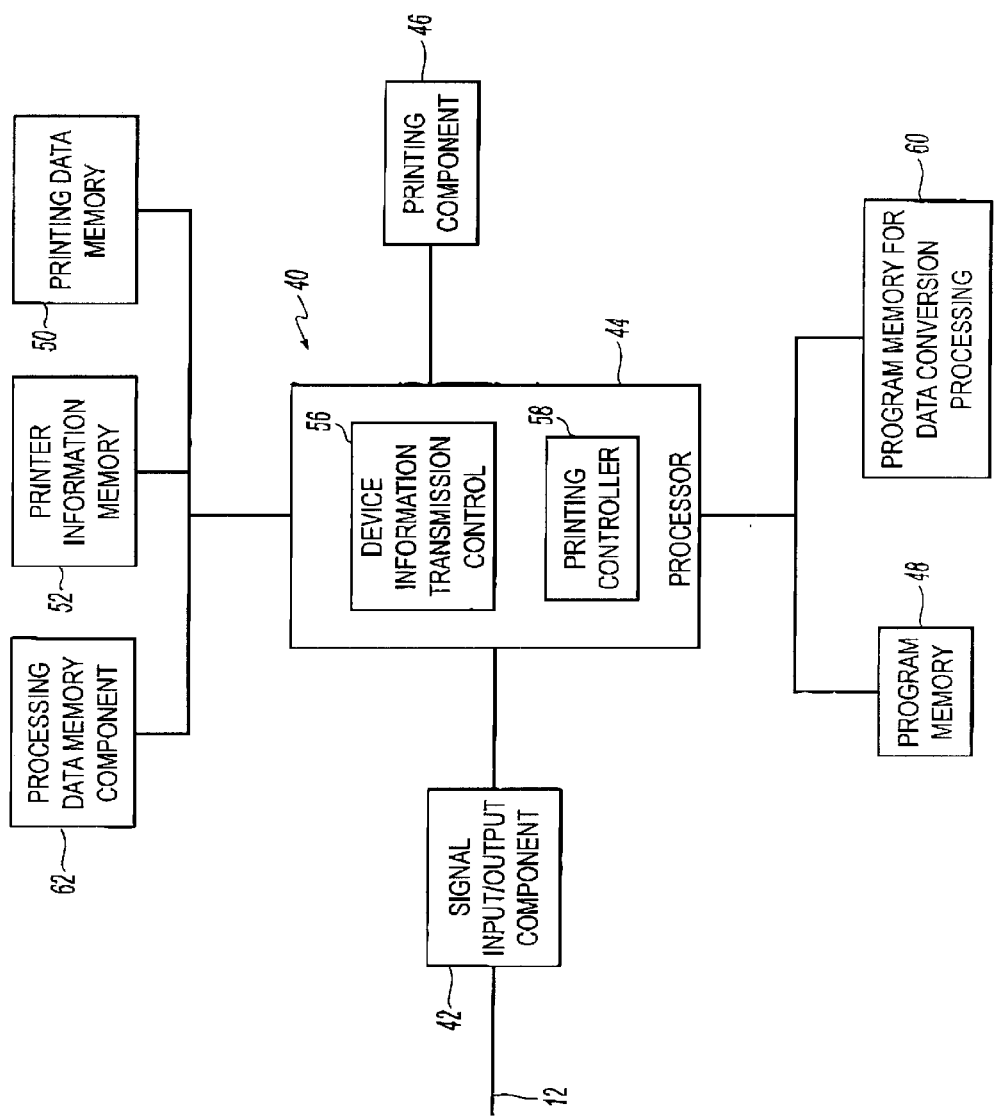
FIG. 7 is a block diagram of the printer which is used in an embodiment of the present invention.

FIG. 7 shows an exemplary block diagram of one of the printers 40a–40c. The printer 40 of the present embodiment comprises a signal input/output component 42, calculation processor 44, which is constructed by using a CPU or the like, a program memory 48 in which operating programs are stored for the printers, a printing data memory 50 which stores the printing data which is sent from the server, a printer information memory 52 which stores an ID which specifies the printer's own type number (machine name), and a printing component 46 which performs actual printing based on the printing data.

The processor 44 functions as a device information transmission controller 56 and a printing controller 58 based on the programs which are stored in the program memory 48. The device information transmission controller 56, in response to the inquiry signal from the printer server 32 of the aforementioned server 20, sends its machine ID and other necessary information which is stored in the printer information memory 52, to the server 20 as device information. The other necessary information may be, for example, the paper sizes on which the printer is capable of printing, the remaining printing ink amount, or the like. The processor 44 is structured to check the hardware of the printer, and detect the paper size and the remaining ink amount every time the aforementioned inquiry signal is received.

Moreover, as discussed below, when the selected printer functions as the image processing server 34, the device information includes the program version information for the data conversion processing program which is stored in the program memory 60 and sends this information to the server 20.

Moreover, the printing controller 58 not only writes the printing data which is sent from the image processing server 34 of the server 20 to the printing data memory 50 which functions as a buffer, but also controls the printing component 46 and prints out the print data in the correct order.

However, depending on the necessity, the printers 40a–40c can be structured so that they have the same functions as the image processing server 34 of the server 20. In this case, a printer, in addition to the above-mentioned structure, comprises a program memory 60 for the data conversion processing and a processing data memory 62.

In the program memory 60, a data conversion processing program matching the device's own resolution for converting image data to printing data, is stored with the program version information. Moreover, when the selected printer has extra capacity, it is appropriate to store a program in the program memory 60 for conversion processing of the image data to printing data and the corresponding program version information matching the resolution of different printers.

Then, the processor 44 functions as an image processing server which converts the image data to printing data based on the data conversion processing program which is stored in the memory 60, and the converted printing data is stored in the processing data memory 62.

Accordingly, the selected printer can convert image data to printing data without going through a server even when the printing instruction and the image processing data is sent directly by designating its own machine from the computer 14.

Furthermore, when the sharing instruction and image data are sent from the server, as described below, the image data is converted to printing data in order according to the sharing instruction, and then sent in order to the selected printer.

Accordingly, since the servers 20A–20B and the printers 40a–40c perform processing to convert the image data to printing data by sharing, the entire system is capable of operating effectively, and its printing speed can be increased.

Figure 8:
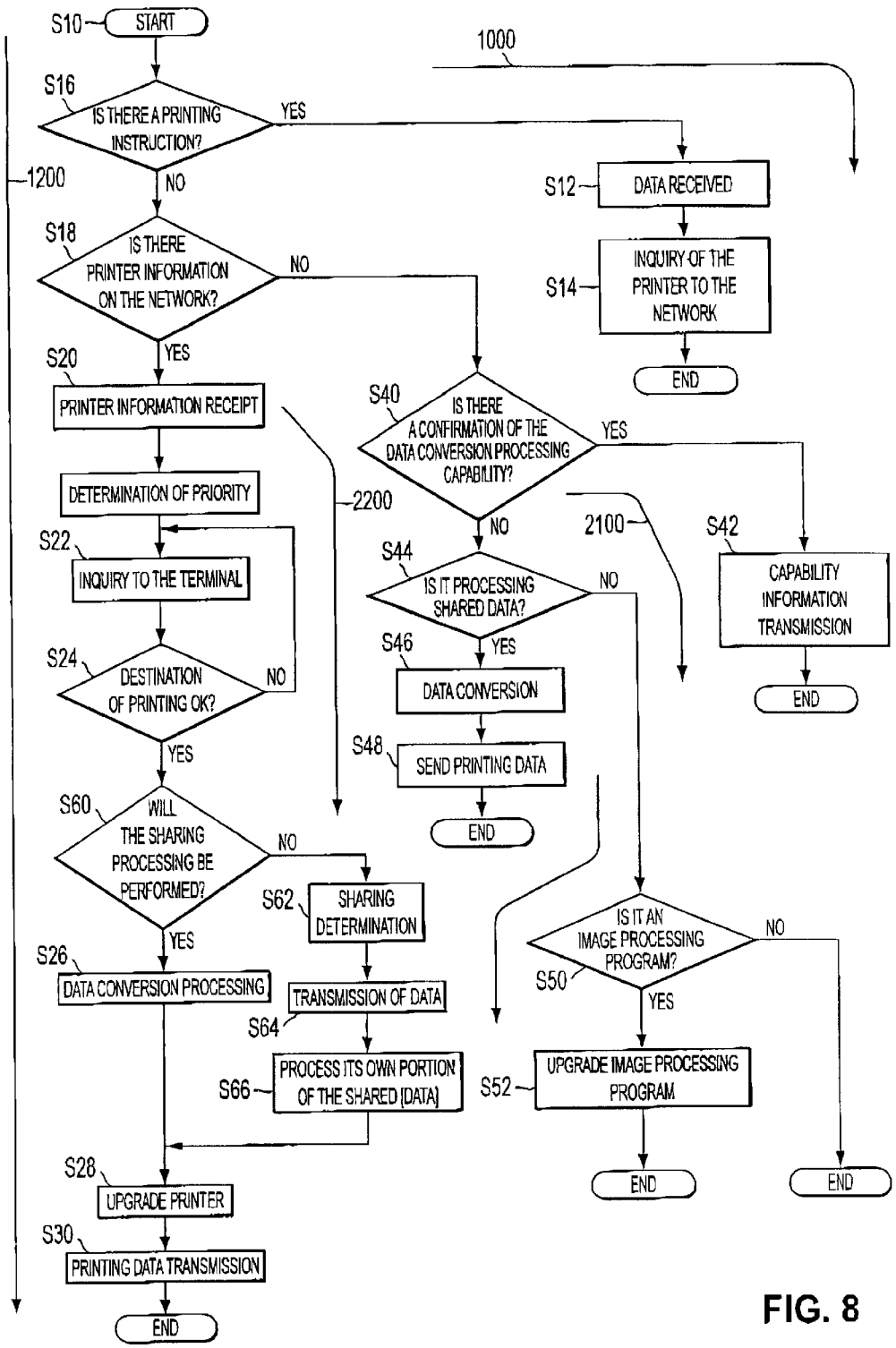
FIG. 8 is a flowchart of a server which is used in an embodiment of the present invention.
Figure 9:
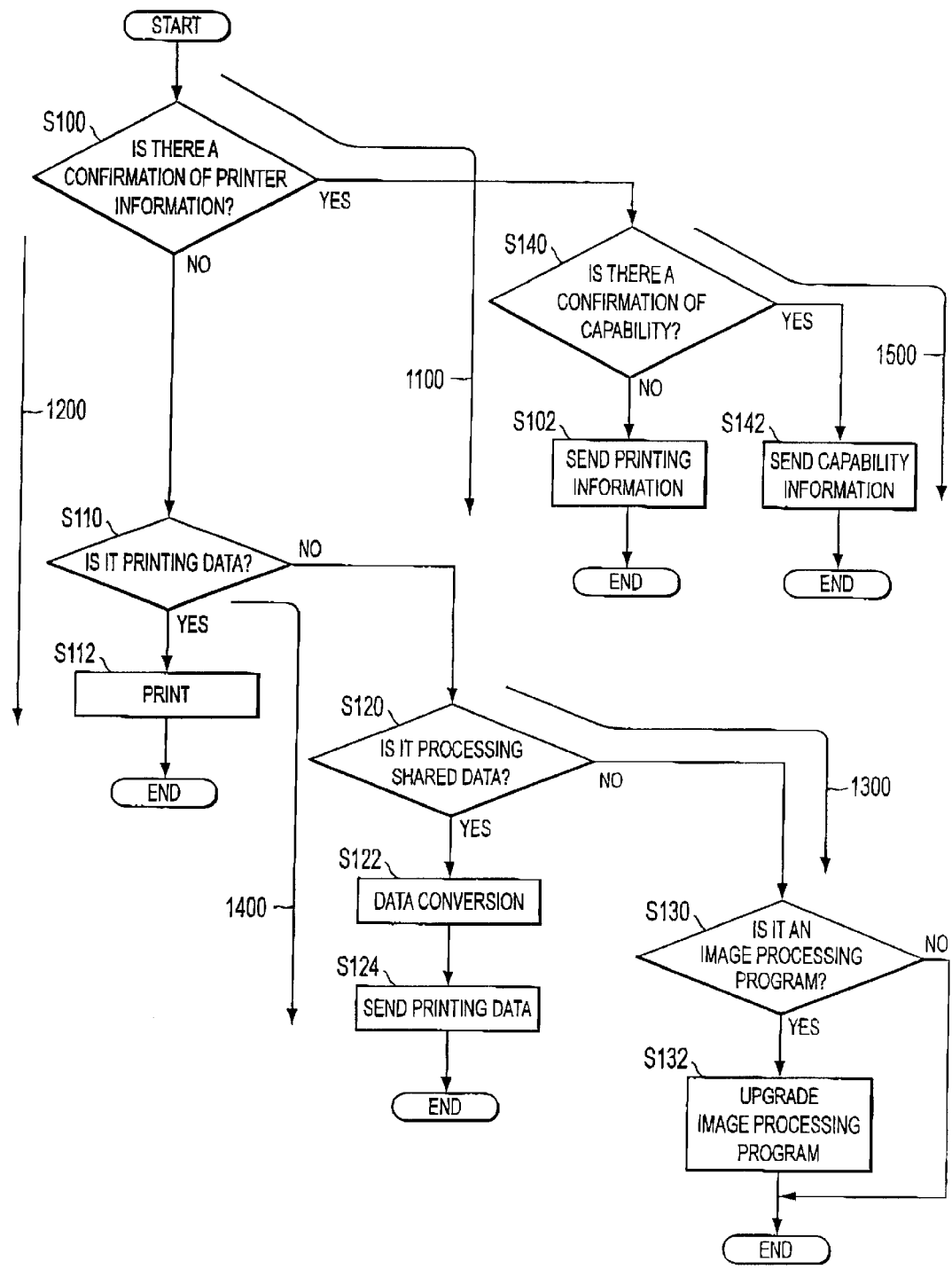
FIG. 9 is a flowchart of a printer which is used in an embodiment of the present invention.

Next, the detailed structure of the of the network system 10 of the present embodiment is explained. In FIG. 8 is a flowchart which shows the function of a server 20A–20B of the present embodiment. FIG. 9 is a flowchart of the function of a printer 40a–40c of the present embodiment.

As shown in FIG. 1, a printing instruction and image data are sent in the order received to the server 20A from the computer 14 as data 100. In this case, the printer server 32 of the server 20A performs the operation which is shown in the flow 1000 of FIG. 8. The printer server 32 identifies the received data 100 as a printing instruction, receives this data (steps S10 and S12), then outputs a device information inquiry signal 110 onto the network (step S14).

Figure 2:
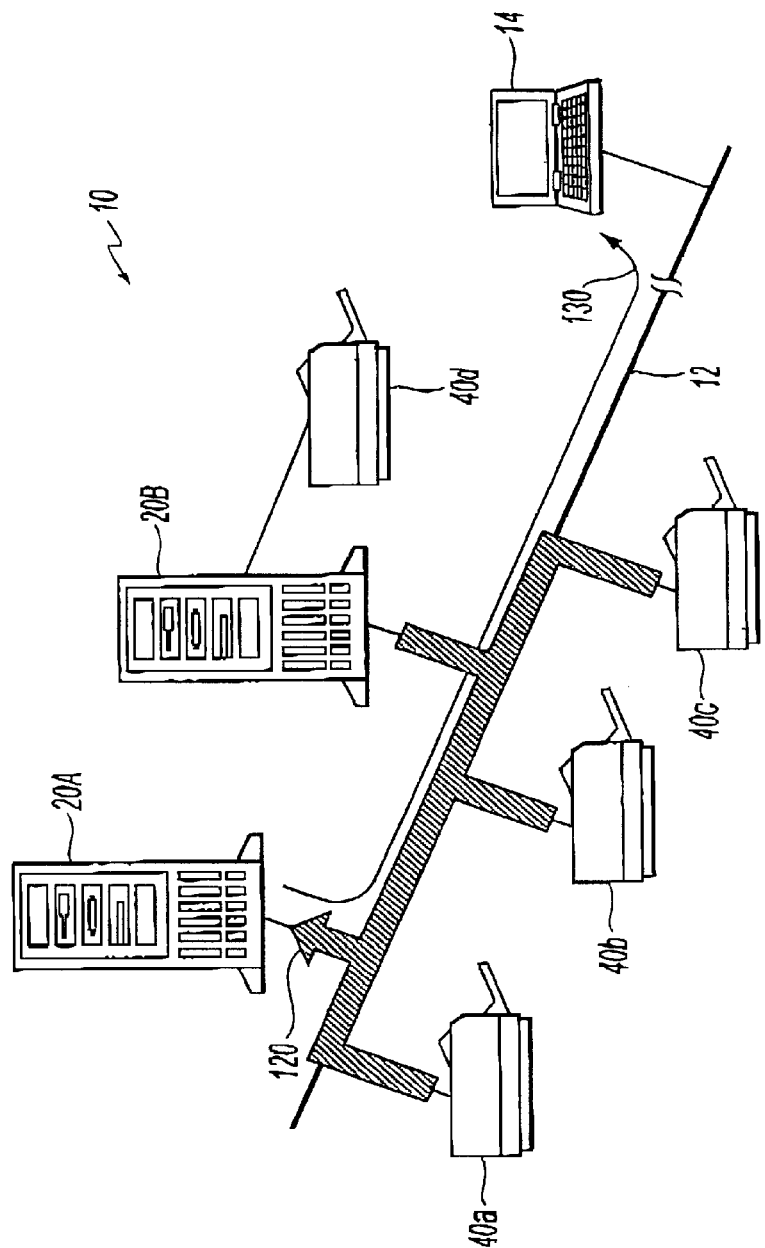
FIG. 2 is a block diagram of the network system of an embodiment of the present invention.

Each printer 40a–40c on the network which receives this inquiry signal 110 operates as shown in the flow 1100 of FIG. 9 in response to the device information inquiry signal 110. In short, each printer 40a–40c determines that the received signal 110 is an inquiry signal (step S100), and returns its own ID which is stored in the printer information memory 52, paper sizes to which it can print, and the remaining ink amount to the server 20 as device information 120, as shown in FIG. 2. At this time, printers 40a–40c which have the data processing program memory 60, include the data processing program version information in the device information 120 and reply.

The server 20, which receives the device information 120 from each printer, operates as shown in the flow 1200 of FIG. 8. In short, the printer server 32 of the server 20 determines that the information 120 received from each printer 40a–40c is device information from a printer on the network, and receives this device information 120 (steps S16 and S18).

Then, based on the device information 120 from each printer, the server 20A–20B determines the priority order of the printers for the intended printing data transmission (step S20). In short, the server 20 evaluates the printing capability, such as the resolution and so forth, of each printer 40a–40c from its ID and selects a printer which satisfies the quality of the image data printing. At this point, even if one of the printers 40a–40c satisfies the image quality, if the paper size which is included in the received device information 120 does not match, or the remaining ink amount is little, that printer is excluded from consideration. Next, with respect to the selected printers, a priority order is given. Highest priority order is given to the one with shortest delay period.

Figure 3:
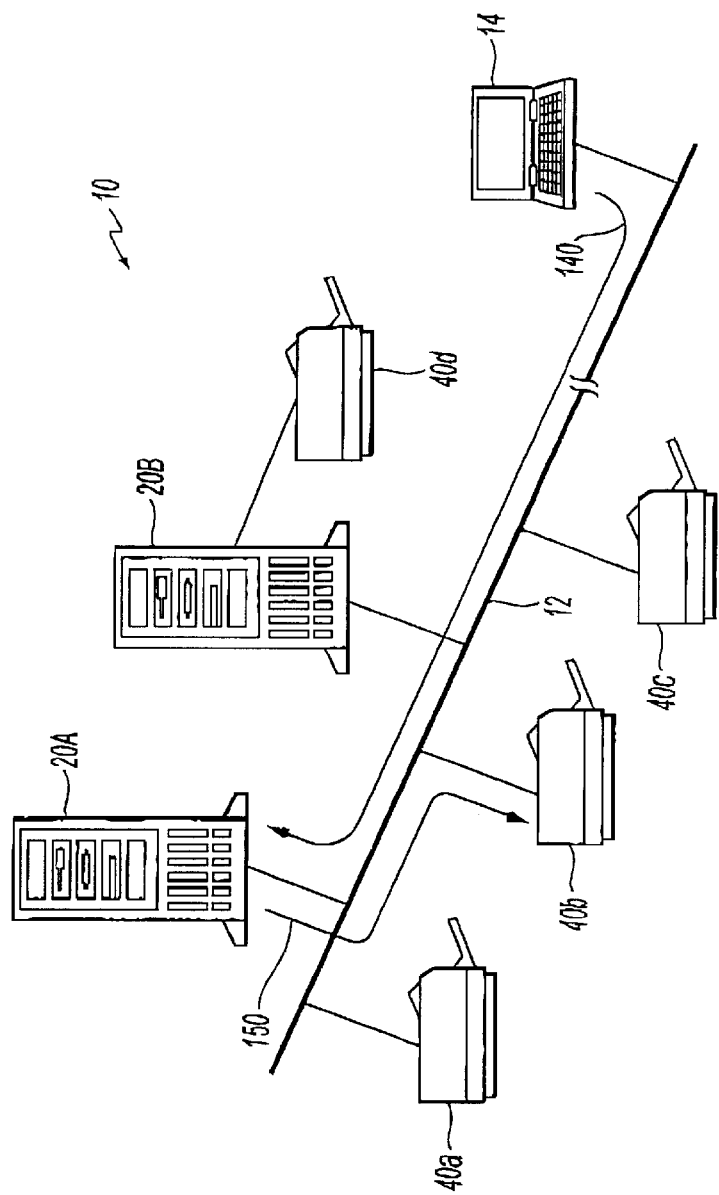
FIG. 3 is a block diagram of the network system of an embodiment of the present invention.

When the prioritization of the printers for the intended printing data transmission is completed, as shown in FIG. 2, an inquiry signal 130 regarding which printer 40a–40c is to be used, is output to the computer 14 (step S22). When the user responds to the inquiry and selects the printer 40a–40c, as shown in FIG. 3, a selecting signal 140 is returned from the computer 14 to the server 20 (step S24).

Next, the image processing server 34 uses the data conversion processing program, which corresponds to the ID of the selected printer, converts the image data to printing data in the proper order. Then the converted printing data is stored in the processing data memory 28 (step S26).

Simultaneous with this conversion processing operation, the processor 24 determines whether the version of the program which is stored in the memory 60 of the selected printer matches with the version which is stored in the image processing data memory 30. If it is determined that the versions do not match, the upgrading program information 150 is sent to the selected printer, as shown in FIG. 3 (step S28).

Figure 4:
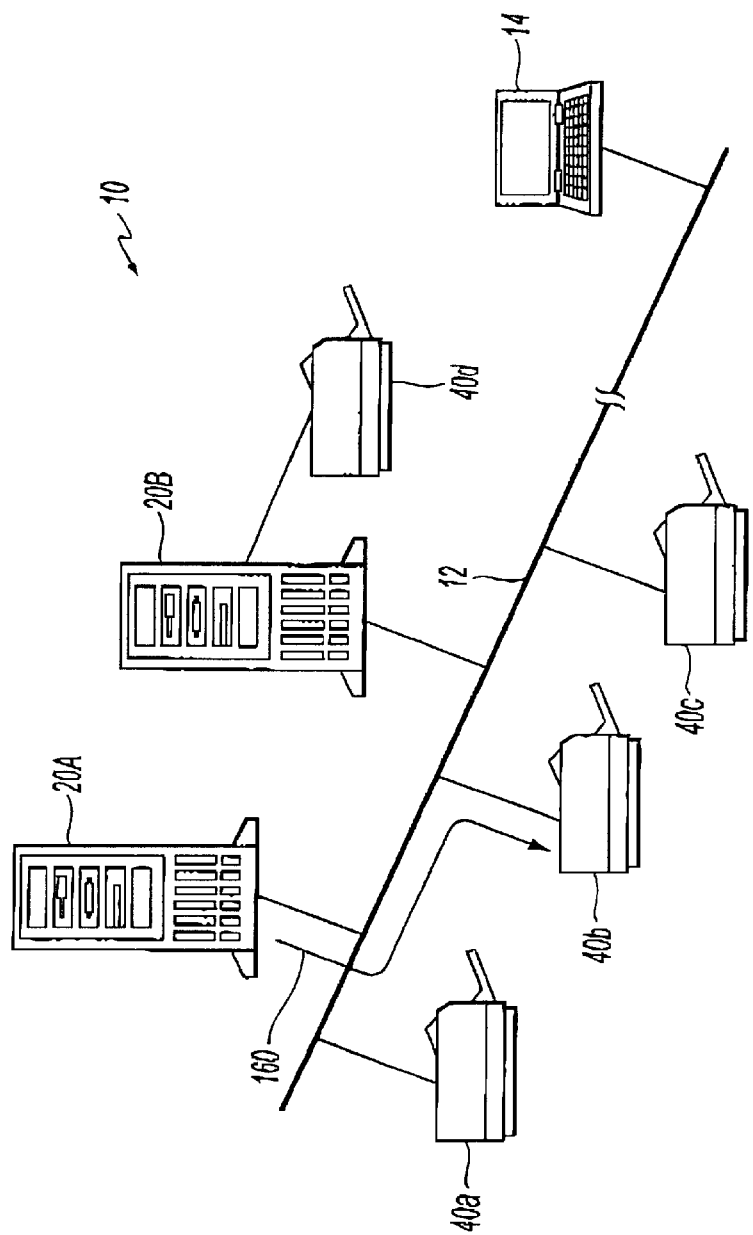
FIG. 4 is a block diagram of the network system of an embodiment of the present invention.

Moreover, this image processing server 34 sends the printing data 160 which is created by the aforementioned data conversion processing to the selected printer as shown in FIG. 4 (step S30).

The selected printer which receives the data 150, 160 operates as shown in the flows 1200 and 1300 of FIG. 9. In short, the selected printer, when it receives the upgrading program information from the server 20A–20B, as shown in the flow 1300, upgrades the data conversion processing program in the program memory 60 with the corresponding program version information. Specifically, in step S130, the selected printer determines that the received information is an image processing upgrading program, and upgrades the data in the memory 60 at step S132.

Next, when the printing data 160 is sent from the server 20A–20B, the selected printer operates as shown in the flow 1200. Specifically, the received data 160 is identified as printing data, stored in the printed data memory 50, then printed by using the printing component 46 (steps S110 and S120).

When the printing data is sent to the selected printer from the server 20A–20B, since the image processing program in each printer 40a–40c is simultaneously upgraded, the entire system is constantly unified with the newest program version. Therefore, the entire system can operate effectively.

Moreover, when the amount of image data to be processed by the server 20A–20B is large, it is preferable to share the process between the other server 20A–20B, or with a printer which has the processing capability. Therefore, in step S60 as shown in FIG. 8, the server 20 determines whether to perform sharing processing. In short, based on the data amount, image quality and the like, of the image data which was sent from the computer 14, if it is determined that it is preferable to perform the sharing processing due to a large data processing amount (step S60), the server 20A–20B sends out a processing ability inquiry message to another server 20A–20B or a printer which has a processing ability, and determines the server 20A–20B or printer which will share the processing based on the information which was obtained from each device by this message (step S62).

Specifically, when the inquiry message is sent via the communication lines 12 at step S62, the other server operates as shown in the flow 2100 of FIG. 8, and the printer operates as shown in the flow 1500 of FIG. 9. In short, the other server 20A–20B and the printer determine the fact that there was a processing ability inquiry at step S40 and S140, respectively, and sends information which indicates its own data processing ability to the server (step S42, S142). At this time, the ability information which is sent to the server 20A–20B includes the ID of the printer which can share, the program version information, information of how much of a load it currently has, and the like.

The server 20A–20B which receives this information determines whether the device which will share the data conversion processing. In other words, the other server 20A–20B or the printer is selected (step S62), and the image data which each device shares and the address information of the printer 40a–40c to which the printing data will be sent, is transmitted to the sharing device (step S64).

When sending this kind of data, the server 20A–20B determines whether the version of the data conversion processing program of each device which shares the data conversion processing is the newest, and depending on necessity, sends the newest data conversion processing program to each device.

Next, the server 20A–20B performs the data conversion processing which converts the portion of image data which is its own shared portion (step S66). Moreover, the other server 20 which shares the conversion of image data to printing data, operates as shown in the flows 2100 and 2200 of FIG. 8, and the printer which shares the processing operates as shown in the flows 1300 and 1400 of FIG. 9.

Figure 5:
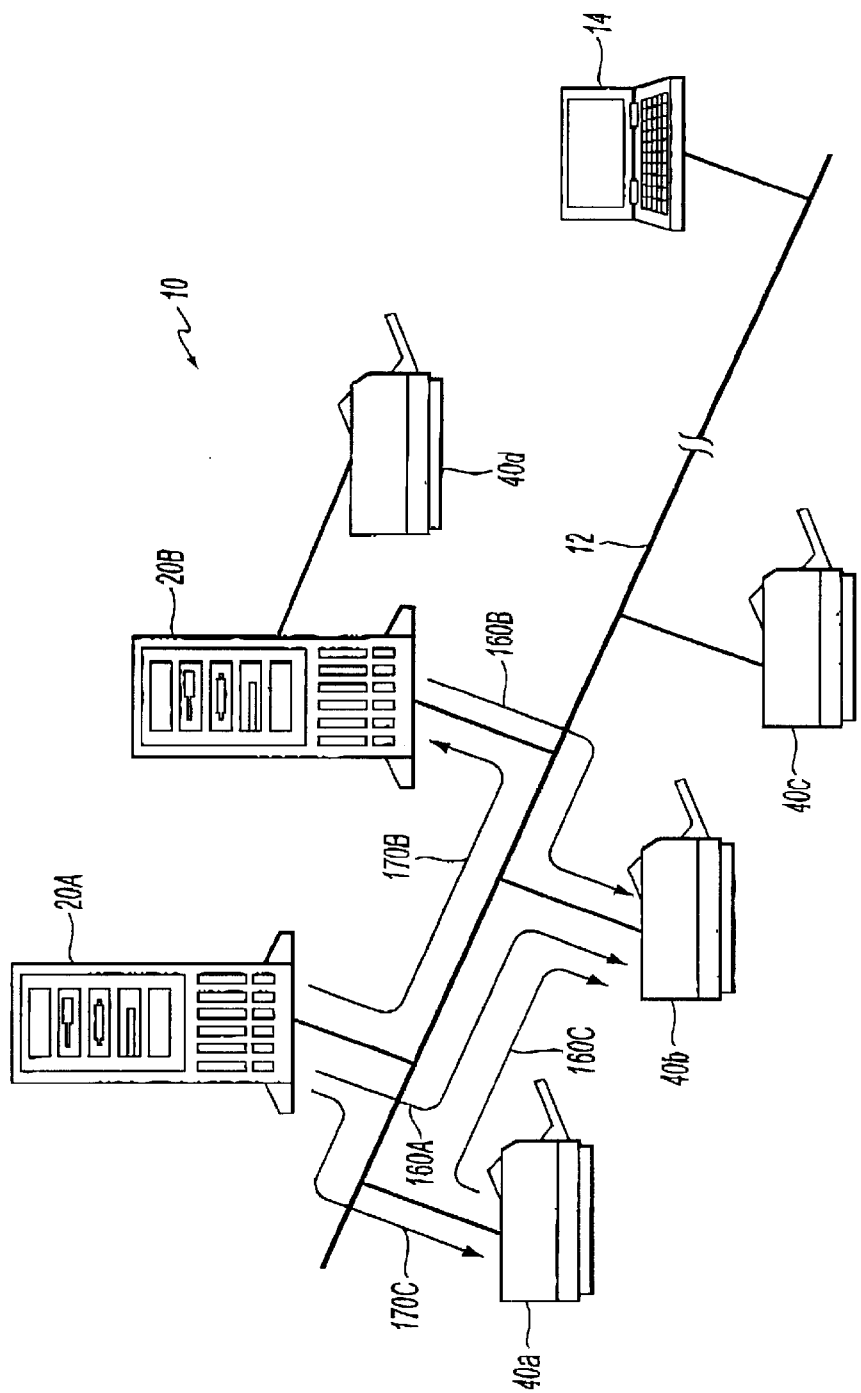
FIG. 5 is a block diagram of the network system of an embodiment of the present invention.

FIG. 5 shows the data flow when shared image data and other attached data 170B, 170C are sent from the server 20A to the other sharing server 20B and the printer apparatus 40a. The data conversion processing program includes version upgrade information, if necessary, in the data 170B, 170C.

When the upgrading information is included in the data 170B, the server 20B which shares the processing, upgrades the data conversion processing program and its program version information which is stored in its own memory 36 in accordance with flow 2100 (steps S50 and S52). Then, the image data which is included in this received data 170B is converted to printing data in accordance with the flow 2200 (step S46), and the printing data is sent to the designated printer 40b (step S48).

Similarly, when upgrading information is included in the data 170C, the printer 40a which shares the processing, in accordance with the flow 1600, upgrades the data conversion processing program and its program version information which are stored in its own memory 60 (steps S130 and S132). Then, the image data which is included in this received data 170B is converted to printing data in accordance with the flow 1400 (step S122), and the printing data is sent to the designated printer 40b (step S124).

Thus, in the system of the present embodiment, the image data which is intended for processing, is shared by using a plurality of servers 20A, 20B and the printer 40a, in order to convert to the printing data simultaneously. Then, the converted printing data 160A, 160B, 160C is sent to the printer 40b from each device for the intended printing data transmission. Then, the printer 40b can print the large amount of printing data at high speed by re-ordering the successively transmitted printing data based on the page information, for example, and storing it in the printing data memory 50.

Moreover, the network system of the present invention is not limited by the aforementioned embodiment, and various kinds of embodiments in different formats are possible within the scope of the summary of the present invention.

For example, in the network system 10 which is shown in FIG. 1, the printing instruction and image data may be sent from the computer 14 to the desired printer in order to print out the image data. Specifically, when the network system shown in FIG. 1 is built, there are cases in which the printer 40c exists near the computer 14, and the other printers 40a, 40b and 40d exist in distant places. In this case, many users desire to print by using near-by printer 40c.

While there is no problem if the printer 40c has a function to convert the image data to printing data, an uncomplicated and inexpensive printer 40c often does not have this kind of function.

Figure 10:
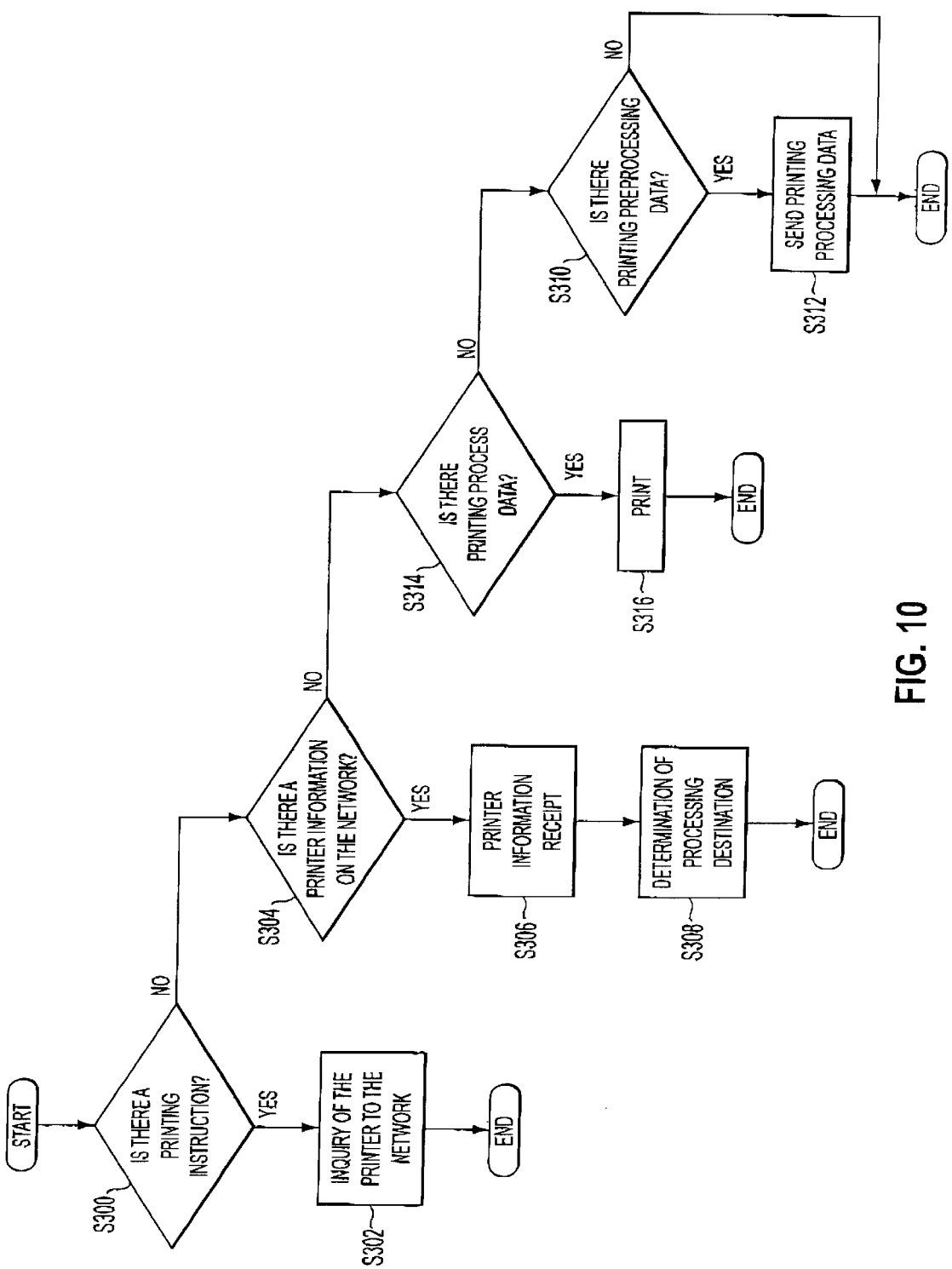
FIG. 10 is a flowchart of a printer which is used in another embodiment of the present invention.
Figure 11:
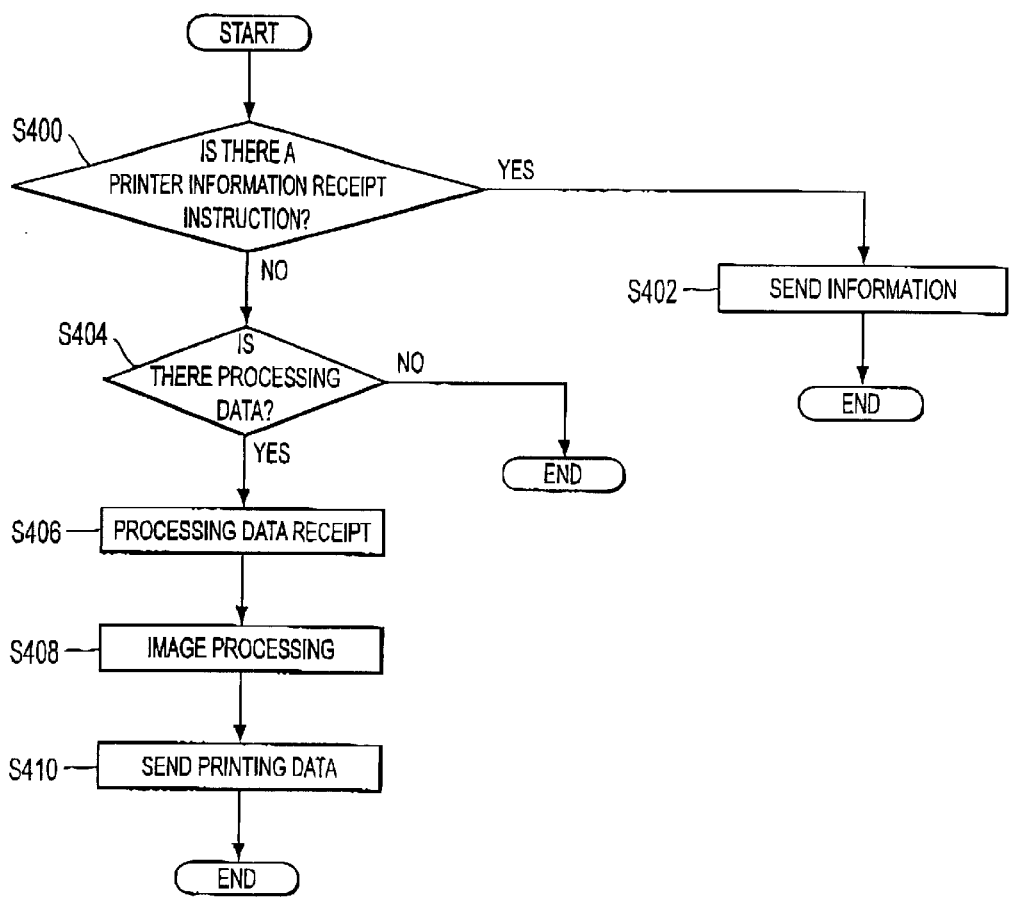
FIG. 11 is a flowchart of a printer or server which is used in another embodiment of the present invention.

Therefore, in the present embodiment, within the printers 40a–40c which comprise the system 10, printers which do not have the ability to convert the image data to printing data are structured to have the function which is shown in FIG. 10, and printers 40a–40c and the servers 20A–20B which have the conversion ability are structured so as to further comprise the function which is shown in FIG. 11. Their specific structure is explained below.

In the present embodiment, the printer 40c which does not have an ability to convert image data to printing data, is structured to be provided with the function of a server, which is shown in steps S300-S312, and the function of a printer, which is shown in steps S314 and 315 in FIG. 10.

In short, when the printing instruction and the image data are sent from the computer 14 to the printer 40c, the printer 40c determines the fact that the printing instruction is received at step S300, and inquires as to the ability of the other printers 40a–40b or the servers 20A–20B on the network at step S302.

With respect to this inquiry, the other printer 40a which has a printing ability and/or the server 20A–20B, as shown in FIG. 11, answer the aforementioned inquiry, and send information regarding their own processing ability to the printer 40c (steps S400 and S402). The printer 40c obtains the information which is sent at step S402 from the other device (steps S304 and S306), and determines the server or the printer from which to request processing (step S308). Then, the printer 40c sends the image data which was sent from the computer 14 to the requested device which is determined at step S308 (steps S310 and S312).

The requested device which received this image data performs data conversion processing to convert the received image data to printing data (steps S404, S406 and S408), then returns the converted printing data to the printer 40c (step S410). Then, the printer 40c print-outputs this printing data in the order received (steps S314 and S316).

Thus, according to the system of the present embodiment, even when the printing instruction and the image data are sent from the computer 14 to the printer 40c which does not have an ability to convert the image data to the printing data, it is possible to convert the image data to printing data by using the capabilities of other devices in order to print the data out.

Moreover, in each exemplary embodiment, the computer 14 is directly connected to the communication lines 12 which structure the network system. However, it is possible to have an external computer access the network system 10 via the server 20A–20B. By doing this, it is possible to avoid illegal external access and to increase security of the network system.

Figure 12:
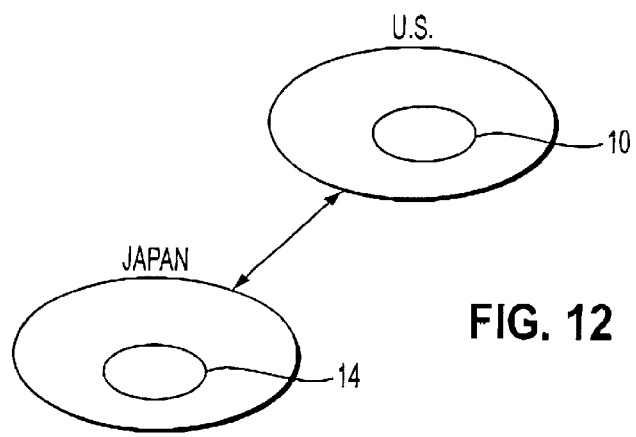
FIG. 12 is a block diagram of another embodiment of the present invention.

Another embodiment of the network system of the present invention is shown in FIG. 12. The network system 10 of the present embodiment is structured so that it is accessible from an external computer 14. Then, the server 20A–20B of the network system 10 is accessed from the external computer 14 and receives the printing instruction and the image data. Similar to the previous embodiments, the server 20A–20B selects the printer 40a–40b for the intended printing data transmission, and print-outputs the image data from the selected printer.

In particular, the present embodiment is optimal for sending printing instructions and image data using the computer 14 from an area which has different printing standards, for example Japan, to a network system which is provided in another area, for example, the U.S.

Therefore, the accessed system 10 can create printing data based on the printing instruction and image data that are sent from Japan, by performing the data conversion processing of the aforementioned image data in order to comply with the U.S. printing standards, and can print-output this data by using an optimum printer.

Moreover, in the present exemplary embodiment, the server 20A–20B is provided in the network system 10. However, when a printer 40a–40c which has sufficiently high capabilities exists, it is appropriate to build the system 10 so that the printer 40a–40c functions as a server. Thus, when the printer also functions as a server, the printer can perform as a printer or perform as a server, as necessary.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as set forth in the following claims.

What is claimed is:

1. A network system, comprising:
   a server that receives a printing instructions and image data for printing which are transmitted from a terminal apparatus and at least one printer connected to the server;
   the server further including:
      a printer server that outputs a device information inquiry signal based upon a printing instruction from the terminal apparatus, the printer server selecting a printer for an intended printing data transmission based upon device information received in response to the device information inquiry signal;

the at least one printer including a device information transmission controller that transmits device information including classification information of the at least one printer to the printer server in response to the device information inquiry signal;

a printer memory;

an image processing server that performs data conversion processing to convert the image data from the terminal apparatus to printing data and transmits the printing data that is formed by the data conversion processing to the selected printer, and the selected printer prints the printing data, and based on the device information provided by the selected printer, the server determining a need for updating a version of a data processing program which is stored in the printer memory based upon the version information, and transmitting information for updating the version of the data processing program to the printer memory when a need for updating the version is determined.

2. The network system as set forth in claim 1, the server further including a memory that stores a data processing program to convert printing capability information and image data to printing data for each printer of different classification, the printer server further selecting the printer for the intended printing data transmission based upon the printing capability information that is read from the memory in response to a load status of each printer and the classification information, and the image processing server further performing the data conversion processing using a data processing program corresponding to the classification of the selected printer.

3. The network system as set forth in claim 1, the printer server further outputting a device information inquiry signal for at least another server or printer based upon a printing instruction from the terminal apparatus, the printer server selecting at least another server or printer to share the data conversion process based upon the device information which is received from other devices in response to the device information inquiry signals, and the printer server transmitting a sharing instruction and shared image data to the selected device, and the image processing server further performing data conversion processing of the shared image data based upon the sharing instruction, and transmitting printing data that is formed by the data conversion processing to the selected printer.

4. The network system as set forth in claim 1, the printer server further outputting a device information inquiry signal to at least another server or printer based upon a printing instruction from the terminal apparatus, determining a priority order of the printers for an intended printing data transmission based upon the device information which is received from other servers or printers in response to the device information inquiry signal, performing a determination selection inquiry to the terminal apparatus, and selecting the printer for the printing data transmission based upon the selection information of the terminal apparatus.

5. The network system as set forth in claim 1, the device information including the data processing program version information that is stored in a printer memory; and the printer including an updating device that updates the data processing program and the program version information which are stored in the printer memory when information for updating the version of the data processing program is received from the server.

6. The network system as set forth in claim 1, wherein one of the printers functions as a server.

7. The network system as set forth in claim 1, the network system further being accessible from an external terminal apparatus, and the server of the network system which was accessed, transmits the printing data to a printer that was selected from the network system.

8. A network system comprising:

a terminal apparatus;

at least one server that includes a printer server and a second server; and a plurality of printers connected to the at least one server, at least one of the plurality of printers including the printer server that outputs a device information inquiry signal to the network based upon a printing instruction and image data received from the terminal apparatus, the printer server selecting the second server which is different from the printer server or a second one of the plurality of printers for data conversion processing based upon device information received from the at least one server and the plurality of printers in response to the device information inquiry signal, and the printer server performing data conversion processing of a portion of the image data and transmitting data conversion instructions and image data including the processed portion of the image data to the selected second server or the second one of the plurality of printers, the second server or second one of the plurality of printers further performing data conversion of the remaining portion of the image data and forming printing data based upon the data conversion instruction, and then transmits the printing data to the one of the plurality of printers which further prints the printing data that is transmitted from the selected second server or second one of the printers.

9. An information processing apparatus that can receive a printing instruction and image data for printing that are transmitted from a terminal apparatus, comprising:

a printer server that outputs a device information inquiry signal to the network based upon a printing instructions from the terminal apparatus, and that selects a printer for an intended printing data transmission based upon a device information received from each printer corresponding to the device information inquiry signal;

a image processing server that performs data conversion processing to convert image data from the terminal apparatus to printing data and transmits the printing data formed by the data conversion processing to the selected printer;

a printer memory;

a data processing program that is stored in the printer memory; and based on the device information provided by the selected printer, a controller that determines whether a version of the data processing program that is stored in the printer memory needs to be updated based upon the current version of the data processing program, and transmits information for updating the data processing program version to the printer memory if it is determined that updating the data processing program version is required.

10. The information processing apparatus as set forth in claim 9, further comprising:

a memory which stores a data processing program to convert printing capability information and image data to printing data for each printer of different classification, the printer server further selects the printer for the intended printing data transmission based upon a load status of each printer and the printing capability information that is read from the memory corresponding to printer classification information, and the image processing server further performing data conversion processing to convert the image data to printing data by using a data processing program corresponding to the classification of the selected printer.

11. The information processing apparatus as set forth in claim 9, the printer server further outputting a device information inquiry signal to at least another server or printer based upon a printing instruction from the terminal apparatus, determining at least another server or printer to share the data conversion processing based upon the device information which is received from the at least another server or printer in response to the device information inquiry signal, and transmitting a sharing instruction and sharing image data to the at least another server or printer, and the image processing server further performing data conversion processing of the shared image data based upon the sharing instruction, and transmitting printing data which is formed by the data conversion processing to the selected printer.

12. The information processing apparatus as set forth in claim 9, the printer server further outputting a device information inquiry signal to at least another server or printer based upon a printing instruction from the terminal apparatus, determining a priority of the printers for printing a data transmission based upon the device information which is received from other printers in response to the device information inquiry signals, performing a determination selection inquiry to the terminal apparatus, and selecting the printer for printing the data transmission based upon selection information of the terminals apparatus.

13. The information processing apparatus as set forth in claim 9, further comprising:

a device information transmission controller to transmit device information, including classification information, to the server in response to a device information inquiry signal from printers or servers, the selected printer printing the data.

14. An information memory medium for controlling an information processing apparatus that can receive a printing instruction and image data for printing that are transmitted from a terminal apparatus, comprising:

first information for outputting a device information inquiry signal to the network based upon a printing instruction from the terminal apparatus, and selecting a printer for an intended printing data transmission based upon device information which is received from each printer or server in response to the device information inquiry signal, and second information for performing data conversion processing to convert image data from the terminal apparatus to printing data and transmit the printing data which is formed by the data conversion processing to the selected printer, based on the device information provided by the selected printer, a version of the second information stored in the information memory medium being updated by receiving transmitted information for updating the version of the second information if it is determined that updating the version of the second information is required.

* * * * *